Sept. 10, 1968   E. K. LEE ETAL   3,400,783
CENTROID SPACED SEISMIC TRANSDUCER ARRAY
Filed Dec. 27, 1966   3 Sheets-Sheet 1
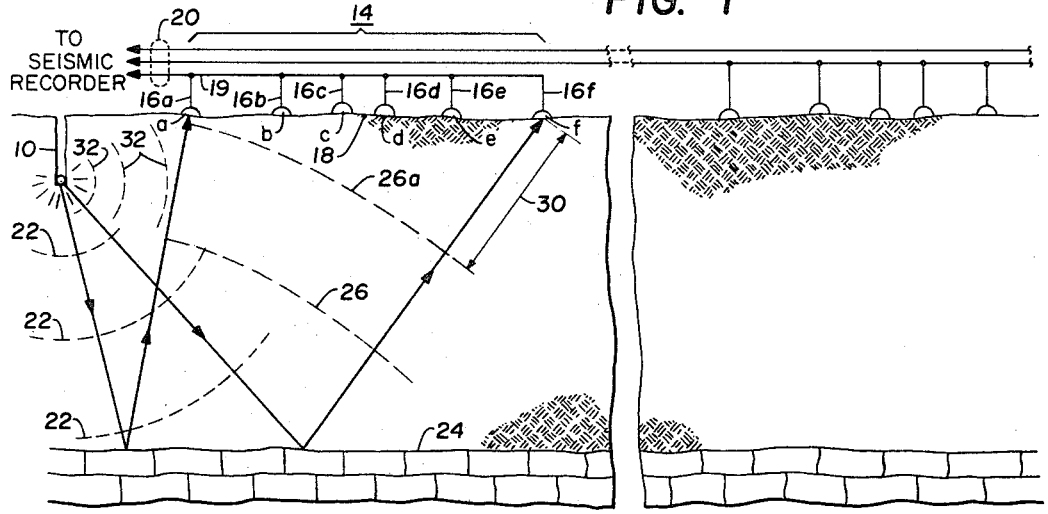
FIG. 1
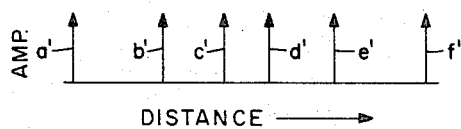
FIG. 2
FIG. 3
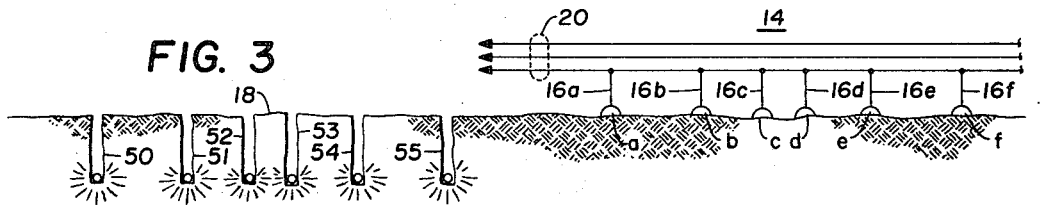
FIG. 4
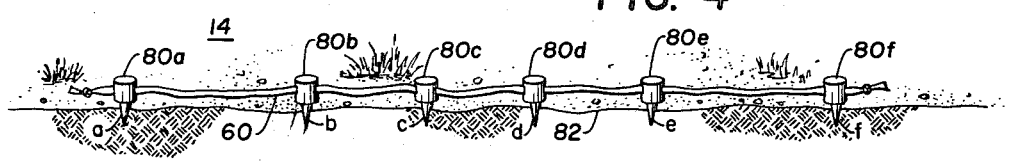

3,400,783
CENTROID SPACED SEISMIC TRANSDUCER ARRAY
Eugene K. Lee, Dallas, and Clyde W. Kerns, Irving, Tex., assignors to Mobil Oil Corporation, a corporation of New York
Filed Dec. 27, 1966, Ser. No. 604,855
13 Claims. (Cl. 181—.5)

ABSTRACT OF THE DISCLOSURE

The specification discloses an inline seismic transducer array for attenuating horizontally traveling noise waves. The output of each transducer is combined to produce a wavenumber response which approaches an ideal low-pass filter in the important low wavenumber region near the pass band. The transducers of the array are of substantially equal sensitivity and are spaced apart at unequal intervals that are in relative proportion to each other according to the intervals between the centroids of the same number of equal areas under the curve of a truncated sinc function. (A truncated sinc function is the major lobe of the Fourier transform of the desired ideal low-pass wavenumber filter and is of the form sin $x/x$.) Thus, the impulse response of the array comprises equally weighted samples, spaced apart unequal distance intervals, which represent, a centroid approximation to equal areas under a truncated sinc function.

BACKGROUND OF THE INVENTION

Field of the invention

This invention relates generally to seismology and more particularly to a transducer array for use in reflection seismic exploration to attenuate horizontally traveling noise waves.

Description of the prior art

Since the inception of reflection seismic exploration, one of the basic problems has been to enhance the desired reflection waves and to suppress or attenuate undesired noise waves. Reflection waves and noise waves have certain properties that permit them to be discriminated. For example, they may be discriminated on the basis of differences in spectral characteristics. One of the earliest methods in seismic exploration for suppressing noise waves on the basis of difference in spectral characteristics was with an electrical filter. In addition, the noise waves may be discriminated from reflection waves on the basis of difference in moveout. Multi-element arrays of seismic energy sources and seismic detectors, generally called seismic transducers, have been used to enhance reflection waves and suppress the noise waves on the basis of difference in moveout characteristics. As is well known, these transducer arrays act as spatial filters directionally responsive to horizontally traveling noise waves to cause their suppression.

The filtering effect of a transducer array can be described in terms of its wavenumber response. The wavenumber of a wavefront moving across a transducer array is defined as the inverse of the apparent wavelength of the wavefront. Just as the impulse response of a time domain filter can be expressed in the frequency domain with a frequency response, the impulse response of a transducer array, which acts as a spatial filter, can be expressed in the wavenumber domain. To achieve a desired response in the wavenumber domain, a certain impulse response in the spatial or distance domain is required. Preferably, the wavenumber response of a seismic transducer array would be an ideal low-pass filter having a sharp cutoff. This ideal low-pass filter would pass without attenuation all the reflection waves with a wavenumber less than the cutoff point, which may be called $K_1$, and would completely reject all noise waves having a wavenumber greater than $K_1$.

The prior art has attempted to achieve an ideal low-pass wavenumber response with various types of arrays of transducer elements with different weighting functions and spacings. For example, U.S. Patent 2,747,172 issued to J. F. Bayhi on May 22, 1956, describes an inline array of equally spaced geophones arranged such that the amplitude of the geophone output is a maximum at the center of the array and tapers to a minimum at each end of the array. In addition, U.S. Patent 2,906,363, issued to C. S. Clay, Jr., on Sept. 29, 1959, discloses an unequally spaced transducer array having transducers of substantially equal sensitivity. The disclosed transducer array in the Clay patent actually comprises at least two sets of equally spaced transducers, the spacing between the sets being incommensurable with the spacing between the transducers within the sets.

These prior art transducer arrays have not made optimum use of a given number of transducers to approximate an ideal low-pass wavenumber response in the region near the pass band. Instead the wavenumber responses of these prior art arrays are characterized by gradually sloping rejection rates near the pass band. There has been needed a transducer array which would provide a very sharp wavenumber rejection rate to permit sharp discrimination between reflection waves and noise waves having very nearly the same wavenumber.

SUMMARY OF THE INVENTION

Our invention contemplates both a method of establishing a transducer array, of either sources or detectors, for attenuating horizontally traveling noise and also a detector cable as an article of manufacture. Broadly, the method of our invention comprises locating an array of placement points along an essentially straight line on a seismic profile at intervals that are in relative proportion to each other according to the intervals between the centroids of the same number of equal areas under a truncated sinc function. A truncated sinc function is defined by:

$$2K_1 \frac{\sin 2\pi K_1 x}{2\pi K_1 x}, \text{ between } -\frac{1}{2K_1} \text{ and } +\frac{1}{2K_1}$$

where
$K_1$=the largest wavenumber of seismic waves desired to be enhanced, and
$x$=the distance along the profile.

At each of these placement points there is positioned a seimic transducer element of substantially equal sensitivity. The output response of each of the transducer elements is combined to produce a wavenumber response which approaches an ideal lowpass filter in the important low wavenumber region near the pass band.

BRIEF DESCRIPTION OF THE DRAWINGS

In the drawings where like reference characters indicate like elements,

FIGURE 1 is a schematic diagram of a detector array of this invention used in a seismic field setup on land;

FIGURE 2 illustrates the inline impulse response of the detector array of FIGURE 1;

FIGURE 3 illustrates a fiield diagram of a combination shot and geophone pattern of this invention;

FIGURE 4 illustrates an enlarged view of a seismic detector cable embodying this invention;

DETAILED DESCRIPTION OF THE INVENTION

Fundamental principles

Figure 5:
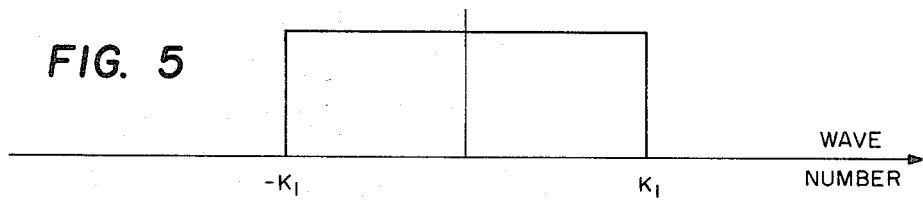
FIGURE 5 illustrates the ideal low-pass filter response in the wavenumber domain.

Referring to FIGURE 1, there is illustrated a seismic field procedure in a diagrammatic form useful in understanding the principles of this invention. As in conventional land seismic profiling, a shot hole is first drilled into the earth at 10. A series of detector stations forming a spread is then spaced out along a straight line seismic profile in line with the shot hole 10, only one complete detector station being shown at 14. Finally, an array or pattern of detectors is placed at each of the detector stations.

By this invention, a novel detector array is placed at each of the detecting stations of the spread. For example, at detecting station 14 there are placed detectors or geophones 16a–16f in contact with the earth at placement points a–f, respectively. The placement points a–f are spaced apart at intervals that are in relative proportion to each other according to the intervals between the centroids of the same number of equal areas under a truncated sinc function. The design for the exact placement of placement points a–f will be described in more detail below, but for now, suffice it to say that the overall length of the array at station 14 should be about equal to one wavelength of horizontally traveling interference noise.

Detectors 16a–16f are of substantially equal sensitivity and are suitably connected in an electrical circuit to a conductor 19 enclosed inside of a cable 20. The other conductors in cable 20 are connected to other detector stations unshown but positioned to the right along the seismic profile. Each of the conductors in cable 20 is connected to a separate channel of a seismic recorded in the conventional manner so that a separate seismic signal or trace is recorded for the output of each detector station.

The inline impulse response of the detector array at station 14 is illustrated in FIGURE 2. The illustrated impulse response comprises a series of delayed impulses $a'-f'$ corresponding to the output response of each of the detectors when a unit impulse moves in an inline direction through the array. Impulses $a'-f'$ have uniform amplitude but are delayed with respect to one another in proportion to the intervals between the placement points $a-f$. As will be described in more detail later, the impulse response illustrated in FIGURE 2 provides a better approximation to an ideal low-pass filter in the wavenumber domain.

The array of detectors at station 14 (FIGURE 1) is so designed as to be directionally responsive to wavefronts, depending upon their incoming direction. Wavefronts that are traveling horizontally along or substantially parallel to the surface of the earth at 18 will be attenuated on the basis of their apparent inline wavenumber. However, vertically traveling wavefronts moving substantially perpendicular to the surface of the earth at 18 will be combined and enhanced by the array. For example, when an explosive is detonated in shot hole 10, there are created spherical seismic waves that travel outwardly in all directions. One downward-going wavefront at 22, for example, may strike a subsurface reflecting bed at 24 where a portion of wavefront 22 will be reflected upward to form a primary reflection wave 26. When reflection wave 26 arrives at the detector array at 14, it is approximately a plane wave which strikes the array very nearly parallel to the earth. Thus, each of detectors 16a–16f produces electrical waves very nearly simultaneously. For example, when wavefront 26a strikes the end detector 16a, it has only the time required to travel the distance 30 to traverse the entire array. This time delay is often referred to in the seismic art as moveout or stepout.

The detector array at 14 is, however, directionally responsive to horizontally traveling waves to cause their suppression. For example, when the explosive in shot hole 10 is detonated there are also created horizontally traveling waves such as surface waves 32. As the surface wave 32 travels through the detector array 14, each detector will respond to create an electrical wave output that is delayed with respect to the output of the other detectors. Assuming that the wave 32 approximates an impulse, the output response of the detectors 16a–16f will be like that shown in FIGURE 2. The combined impulse response of the array at 14 will produce a wavenumber response that suppresses the surface wave 32 in a manner similar to time domain filtering. The detector array at 14 thus provides a series of delayed, but uniformly weighted, amplitude responses to horizontally traveling noise waves.

Ideal wavenumber response

As described above, the detector array at 14 acts as a low-pass filter in the wavenumber domain. The vertically traveling signal can be discriminated from the horizontally traveling noise on the basis of wavenumber. The reflection signal has low wavenumber, while the noise generally has a high wavenumber. The wavenumber of a wavelet is expressed by:

$$K = f/v \qquad (1)$$

where $f$ = the frequency of the wavelet, and
$v$ = the velocity of the wavelet.

Thus, it is apparent that the wavenumber of a wavelet is the inverse of its wavelength. In conventional seismic practice, noise spreads or noise surveys are generally conducted in a new exploration area so that the parameters $f$ and $v$ are known for the noise waves as well as the reflection signal.

FIGURE 5 illustrates the desired wavenumber response of an optimum detector array. The response of the array would act as an ideal low-pass filter below wavenumbers $+K_1$. All of the reflection signal would fall in the region between zero and $+K_1$ wavenumbers and would be passed with unit amplitude. However, the noise waves would fall in the region greater than wavenumber $+K_1$ so that they would be infinitely suppressed or rejected.

Figure 6:
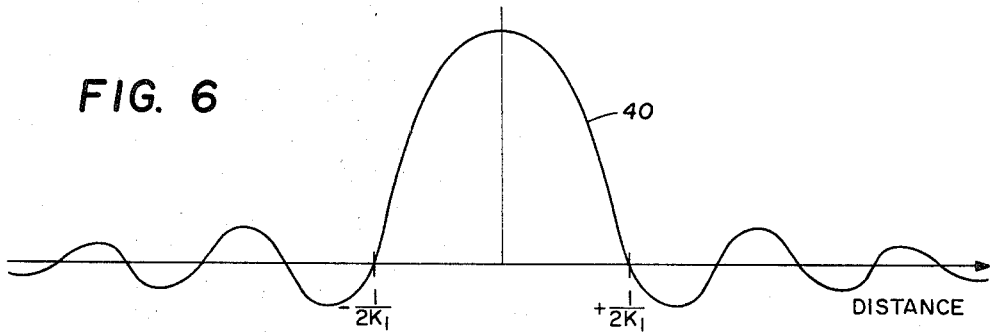
FIGURE 6 illustrates a sinc function which is the array impulse response in the distance domain required to give the wavenumber response of FIGURE 5.
Figure 7:
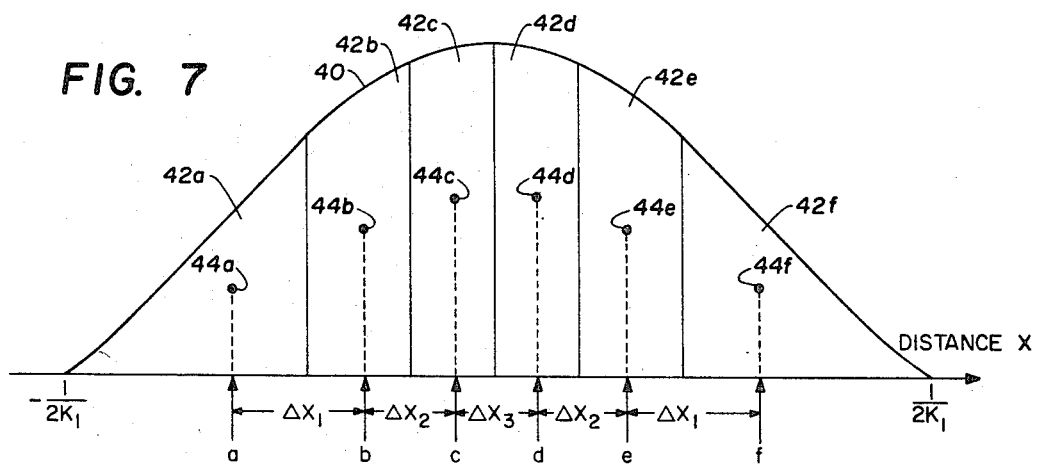
FIGURE 7 is an enlarged view of a truncated sinc function which is the major lobe of the sinc function of FIGURE 6.
Figure 8A:
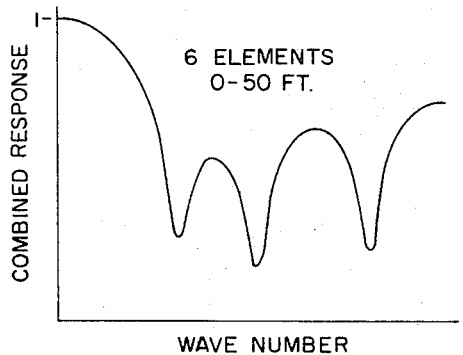
FIGURES 8A–8D illustrate the steady state, wavenumber response curves for transducer arrays embodying this invention.
Figure 8C:
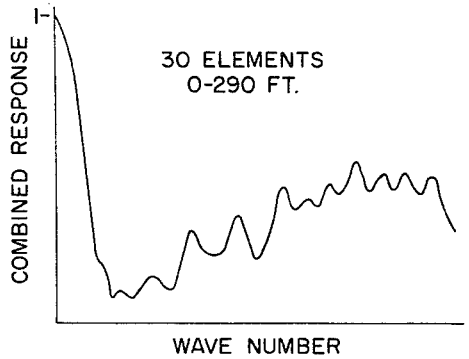
Figure 8B:
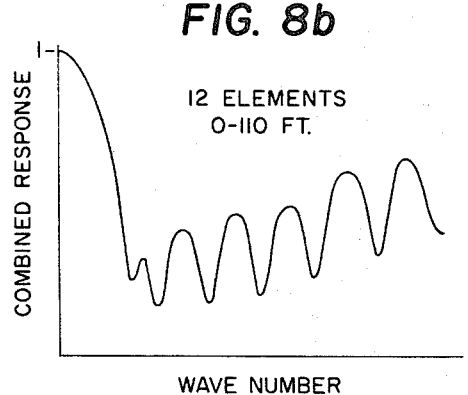
Figure 8D:
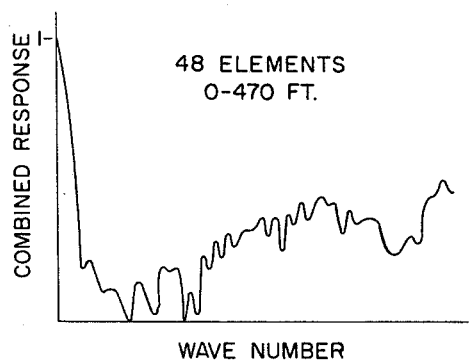

In practical applications, the ideal low-pass wavenumber response of FIGURE 7 cannot be achieved exactly. The wavenumber response of most seismic transducer arrays approximate this ideal wavenumber response. As is well known, the impulse response of a transducer array is related to its wavenumber response by the Fourier transform. Thus, the ideal low-pass wavenumber response of FIGURE 5 has an equivalent impulse response illustrated in FIGURE 6. The impulse response of FIGURE 6 is a sinc function given by:

$$u(x) = 2K_1 \frac{\sin 2\pi K_1 x}{2\pi K_1 x} \quad (2)$$

where $K_1$ = the longest wavenumber of seismic waves desired to be enhanced or passed, and $x$ = the distance along the profile.

Ideally, the impulse response of a transducer array would conform exactly to the sinc function illustrated in FIGURE 6. However, the sinc function extends in infinite length in both the positive and the negative directions, making such exact conformance impossible. Furthermore, the sinc function contains negative portions so that a transducer array whose impulse response conformed to these negative portions would cause phase reversal error in the reflection signal. Therefore, the optimum approximation to the ideal low-pass filter response of FIGURE 5 may be achieved by designing an array with an impulse response that conforms to the major lobe of the sinc function between nodal points $$-\frac{1}{2K_1} \text{ and } +\frac{1}{2K_1}$$

An enlarged view of the major lobe 40, which may be called a truncated sinc function, is illustrated in FIGURE 7.

Determining the location of array elements

In accordance with this invention, the location of transducer array elements is determined by dividing the area under the truncated sinc function 40 into the same number of equal areas as the number of transducer elements in an array and locating the transducer elements according to the location of the centroid of each of these areas. More specifically, the location of each transducer element is determined by the following steps explained with reference to FIGURE 7:

(1) The truncated sinc function 40 is generated according to Equation 2 above. As will be noted from an inspection of Equation 2, the sinc function is specified as soon as the parameter $K_1$ is given. It will be remembered that $K_1$ is equal to the largest wavenumber of seismic waves desired to be enhanced. Any noise waves with wavenumbers greater than $K_1$ will be suppressed. The truncated sinc function 40 may be generated as an electrical function in a computer or, more simply, may be plotted as a graph or curve on quadruled paper.

(2) The area under curve 40 is divided into the same number of equal areas as the number of elements in the array to be designed. For example, for the six-element array of FIGURE 1, the truncated sinc function 40 is divided into six equal areas 42a–42f. These equal areas may be determined graphically by counting squares on quadruled paper or by mathematical calculation, such as in a computer.

(3) The centroid of each of the equal areas under curve 40 is determined. For example, the centroids 44a–44f are determined respectively for the areas 42a–42f. A centroid of an area is defined conventionally as the point at which a plane defined by the area will balance. Stated differently, the centroid of an area is the center of gravity of a plane defined by the area. Centroids 44a–44f may be determined approximately by judging the center of gravity of each area according to the eye or precisely by mathematical calculation.

(4) A transducer element is located according to location of the centroids of the equal areas under curve 40. For example, a transducer element is located at each of the placement points a–f. The placement points a–f are defined by the illustrated dashed lines passing through the centroids 44a–44f and perpendicular to the "X" axis of the sinc function. Once the placement points a–f are determined, then the relative intervals between transducer elements are also determined. The interval between each placement point is a measurable quantity which specifies a transducer array. For example, adjacent placement points a, b, c, and d are separated respectively by intervals $\Delta X_1$, $\Delta X_2$, and $\Delta X_3$. Since the curve 40 is symmetrical, the between points d and e is also equal to $\Delta X_2$ and the interval between points e and f is equal to $\Delta X_1$. The intervals between the elements of a six-element transducer array positioned in the field will be proportional to $\Delta X_1$, $\Delta X_2$, and $\Delta X_3$.

Example arrays

The spacings for arrays with several example numbers of elements are given in Tables I–VI. The numbers listed in Tables I–VI give the transducer placement points in total feet removed from one end of each array. The overall length of each array is indicated by the last number of the sequence in each table. For arrays of the same number of elements as in the tables but having other lengths, multiply each transducer placement point by $L_D/L_E$ where $L_D$ is the desired overall length of the array, and
$L_E$ is the length used in each example.

TABLE I

*6 elements*

0 12 21 29 38 50

TABLE II

*12 elements*

0 16 27 36 44 51 59 66 74 83 94 110

TABLE III

*18 elements*

0 19 32 42 51 59 67 74 81 89 96 103 111 119 128 138 151 170

TABLE IV

*30 elements*

0 24 40 52 63 73 82 90 98 106 113 120 128 135 142 148 155 162 170 177 184 192 200 208 217 227 238 250 266 290

TABLE V

*48 elements*

0 30 50 66 79 91 102 112 121 130 139 148 156 164 171 178 186 193 200 207 214 220 226 232 238 244 250 256 263 270 277 284 292 299 306 314 322 331 340 349 358 368 379 391 404 420 440 470

TABLE VI

*64 elements*

0 34 56 74 88 102 114 126 137 146 156 165 174 183 191 199 207 214 222 229 237 244 251 258 265 271 278 285 292 298 305 312 318 325 332 338 345 352 359 365 372 379 386 393 401 408 416 423 431 439 447 456 465 474 484 493 504 516 528 542 556 574 596 630

Array response curves

Figure 9A:
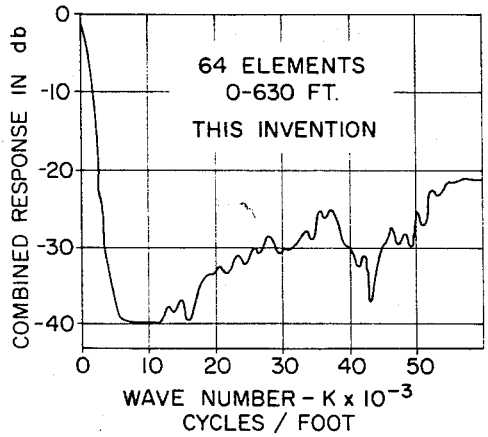
FIGURES 9A and 9B illustrate respectively the wavenumber response of this invention and the wave number response of prior art transducer arrays with equally spaced elements.
Figure 9B:
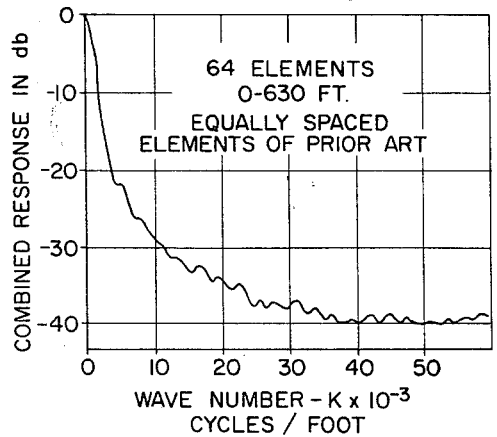

The steady state wavenumber response curves for several of the arrays specified in the foregoing tables are illustrated in FIGURES 8A–8D. FIGURES 9A and 9B illustrate the comparison between the steady state wavenumber responses of an array of 64 elements spaced over a total length of 630 feet in accordance with this invention and the same number of elements and length with a prior art array of equally spaced elements. As indicated in FIGURE 9A, the wavenumber response produced by the arrays of this invention provides a better approximation to an ideal low-pass filter in the important small wavenumber region. For example, at a wavenumber of $6 \times 10^{-3}$ cycles per foot, the amplitude of the response curve of FIGURE 9A is less by 15 db than the amplitude of response curve of FIGURE 9B.

While the response curve of FIGURE 9A does show large amplitude in the wavenumber region greater than about $K=20\times10^{-3}$ cycles per foot, there is usually less noise in this region. Usually noise waves with wavenumbers in the region of 20 to $50\times10^{-3}$ cycles per foot or greater have high frequencies which can be filtered out with electrical filtering. For example, for a noise wave with a wavenumber $K=50\times^{-3}$ and a velocity of 2,000 feet per second, its frequency is 100 cycles and can be suppressed with electrical filtering.

Seismic source arrays

While our invention has been so far described with reference to detector arrays, the principles of the invention are equally applicable to shot or seismic source arrays. For example, in FIGURE 3 there is illustrated an array of shot holes 50–55 drilled in the earth at 18 along a straight line of a profile. Shot holes 50–55 are distributed at intervals that are in relative proportion to each other according to the intervals between the centroids of equal areas under a truncated sinc function as described above. A charge of dynamite of substantially equal effectiveness is placed in each of the shot holes 50–55. Each of the charges is suitably connected to a blaster circuit so that all charges are adapted to be detonated simultaneously. If the shot holes are spaced over a total 50-foot length with spacings according to Table I, then the amplitude response curve (steady state) of the combined shot array will be that of FIGURE 8A. Thus, horizontally traveling waves will be suppressed, and vertical, downward-going waves will be enhanced.

Where a shot array is used in conjunction with a detector array at station 14, the combined wavenumber response of both arrays will be the product of the wavenumber response of each array separately. Thus, when both shot and detector arrays are used simultaneously, the suppression of horizontally traveling noise waves is even greater.

Seismic detector cables

Our invention also contemplates, as an article of manufacture, a seismic detector cable including an array of physically integrated detectors with spacings according to the teachings of our invention. For example, in FIGURE 4 there is illustrated a so-called "jumper cable" 60 suitable for use as the detector station 14 of FIGURE 1. Jumper cable 60 has an outer, flexible and abrasion-resistant sheath including therein a number of electrical conductors. Detectors 80a–80f are physically integrated with cable 60 and are spaced apart at intervals according to this invention. Each of detectors 80a–80f is of substantially equal sensitivity, or is otherwise connected, so that their combined amplitude response is uniform throughout the length of the array. The electrical output of each detector 80a–80f is connected in common electrical circuit to the conductors within the cable 60. Thus the wavenumber response of detector cable 60 closely approximates an ideal low-pass filter.

It will be appreciated that a detector array of this invention may also be made integral with the main detector cable running the full length of a seismic spread. Furthermore, the principles of our invention may obviously be employed in the manufacture of marine seismic cables with integral detectors.

Now that our invention has been completely described and illustrated, those skilled in the art may imagine certain modifications still within the true spirit and scope of the invention. It is intended to cover all such modifications as fall within the scope of the appended claims.

The invention claimed is:

1. In seismic exploration, the method comprising:
   (a) locating an array of placement points along an essentially straight line on a seismic profile at intervals that are in relative proportion to each other according to the intervals between the centroids of the same number of equal areas under the function given by:

$$2K_1 \frac{\sin 2\pi K_1 x}{2\pi K_1 x}, \text{ between } -\frac{1}{2K_1} \text{ and } +\frac{1}{2K_1}$$

where
   $K_1$=the largest wavenumber of seismic waves desired to be enhanced, and
   $x$=the distance along the profile,
   (b) positioning a seismic transducer element of substantially equal sensitivity at each of said placement points, and
   (c) combining the output response of each of said transducer elements.

2. The method of claim 1 wherein step (b) includes positioning a seismic detector of substantially equal sensitivity at each of said placement points.

3. The method of claim 2 including combining the output of each detector.

4. The method of claim 1 wherein step (b) includes positioning a seismic wave source of substantially equal effectiveness at each of said placement points.

5. The method of claim 4 further including energizing said seismic wave sources simultaneously.

6. The method of claim 1 wherein said array includes six placement points which are located at intervals in relative proportion according to Table I of the specification.

7. The method of claim 1 wherein said array includes twelve placement points which are located at intervals in relative proportion according to Table II of the specification.

8. The method of claim 1 wherein said array includes eighteen placement points which are located at intervals in relative proportion according to Table III of the specification.

9. The method of claim 1 wherein said array includes thirty placement points which are located at intervals in relative proportion according to Table IV of the specification.

10. The method of claim 1 wherein said array includes forty-eight placement points which are located at intervals in relative proportion according to Table V of the specification.

11. The method of claim 1 wherein said array includes sixty-four placement points which are located at intervals in relative proportion according to Table VI of the specification.

12. In seismic exploration wherein it is desired to enhance reflection waves having an apparent wavenumber along a profile less than $K_1$ and suppress noise waves having a wavenumber greater than $K_1$, the improved method comprising:
   (a) locating an array of $n$ placement points along an essentially straight line on a seismic profile at intervals that are in relative proportion to each other according to the intervals between the centroids of $n$ equal areas under the function given by:

$$2K_1 \frac{\sin 2\pi K_1 x}{2\pi K_1 x}, \text{ between } -\frac{1}{2K_1} \text{ and } +\frac{1}{2K_1}$$

where
   $x$=the distance along the profile,
   (b) positioning a seismic transducer element of substantially equal effectiveness at each of said placement points, and
   (c) combining the output response of each of said transducer elements.

13. As an article of manufacture, a seismic wave detector cable comprising:
   (a) an outer cable sheath including therein electrical conductors,
   (b) an array of seismic detectors integral with said cable sheath, said seismic detectors being spaced apart at intervals that are in relative proportion to each other according to the intervals between the centroids of the same number of equal areas under the function:

$$2K_1 \frac{\sin 2\pi K_1 x}{2\pi K_1 x}, \text{ between } -\frac{1}{2K_1} \text{ and } +\frac{1}{2K_1}$$

where
$K_1$=the largest wavenumber of the seismic waves to be detected, and
$x$=distance along said cable sheath, and
(c) means for connecting the output of each detector in common circuit with said electrical conductors in such a manner that the impulse response of the array is uniform.

References Cited

UNITED STATES PATENTS

| | | | |
|---|---|---|---|
| 2,747,172 | 5/1956 | Bayhi | 340—15.5 |
| 2,906,363 | 9/1959 | Clay | 181—5 |
| 3,096,846 | 7/1963 | Savit et al. | 181—5 |

SAMUEL FEINBERG, *Primary Examiner.*